Oct. 4, 1938.  C. C. GULDBECH  2,132,158
DOUGH TWISTING MACHINE
Filed June 1, 1938  2 Sheets-Sheet 1
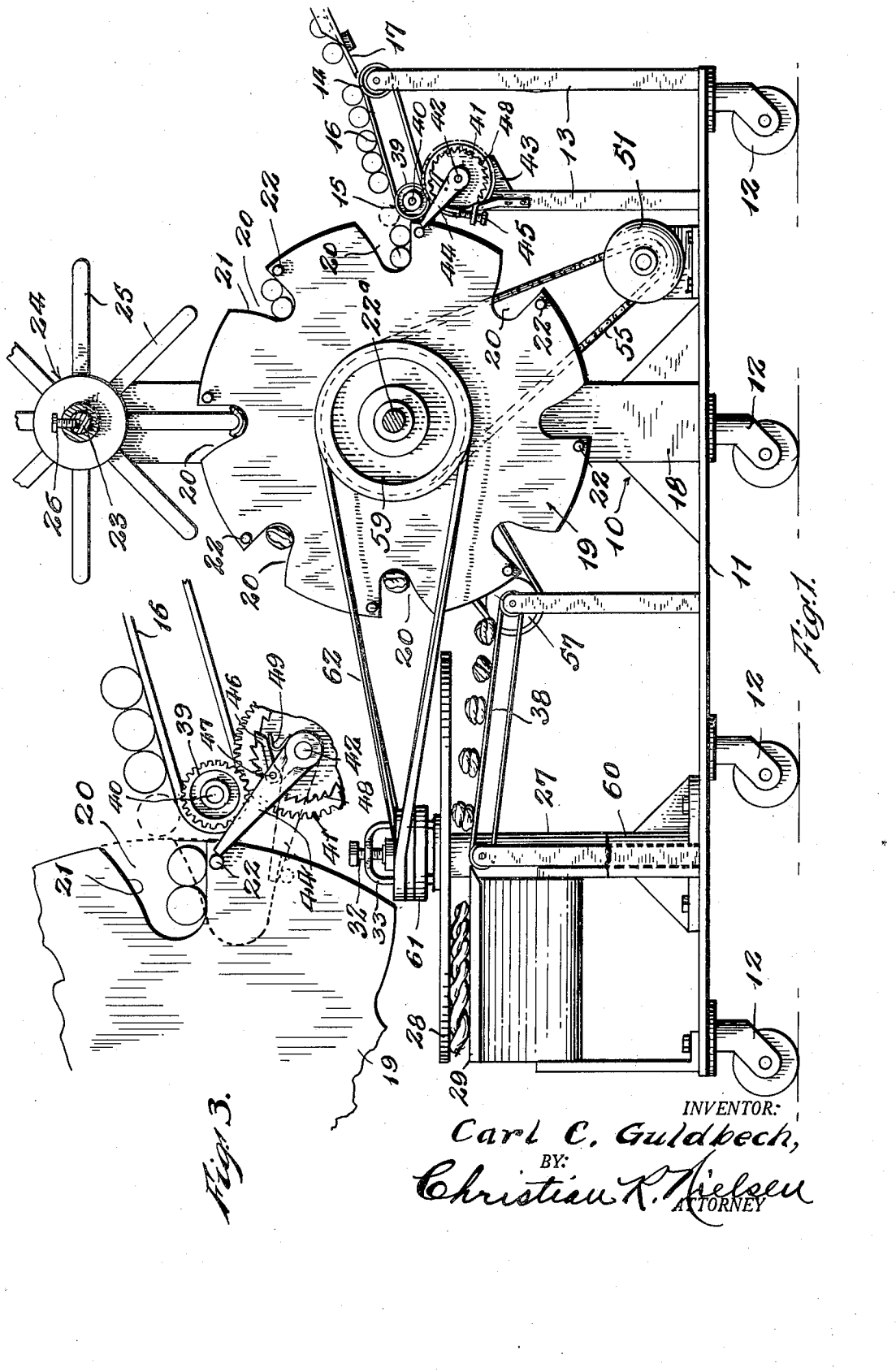
INVENTOR:
Carl C. Guldbech,
BY: Christian K. Nielsen
ATTORNEY Oct. 4, 1938.    C. C. GULDBECH    2,132,158
DOUGH TWISTING MACHINE
Filed June 1, 1938    2 Sheets-Sheet 2
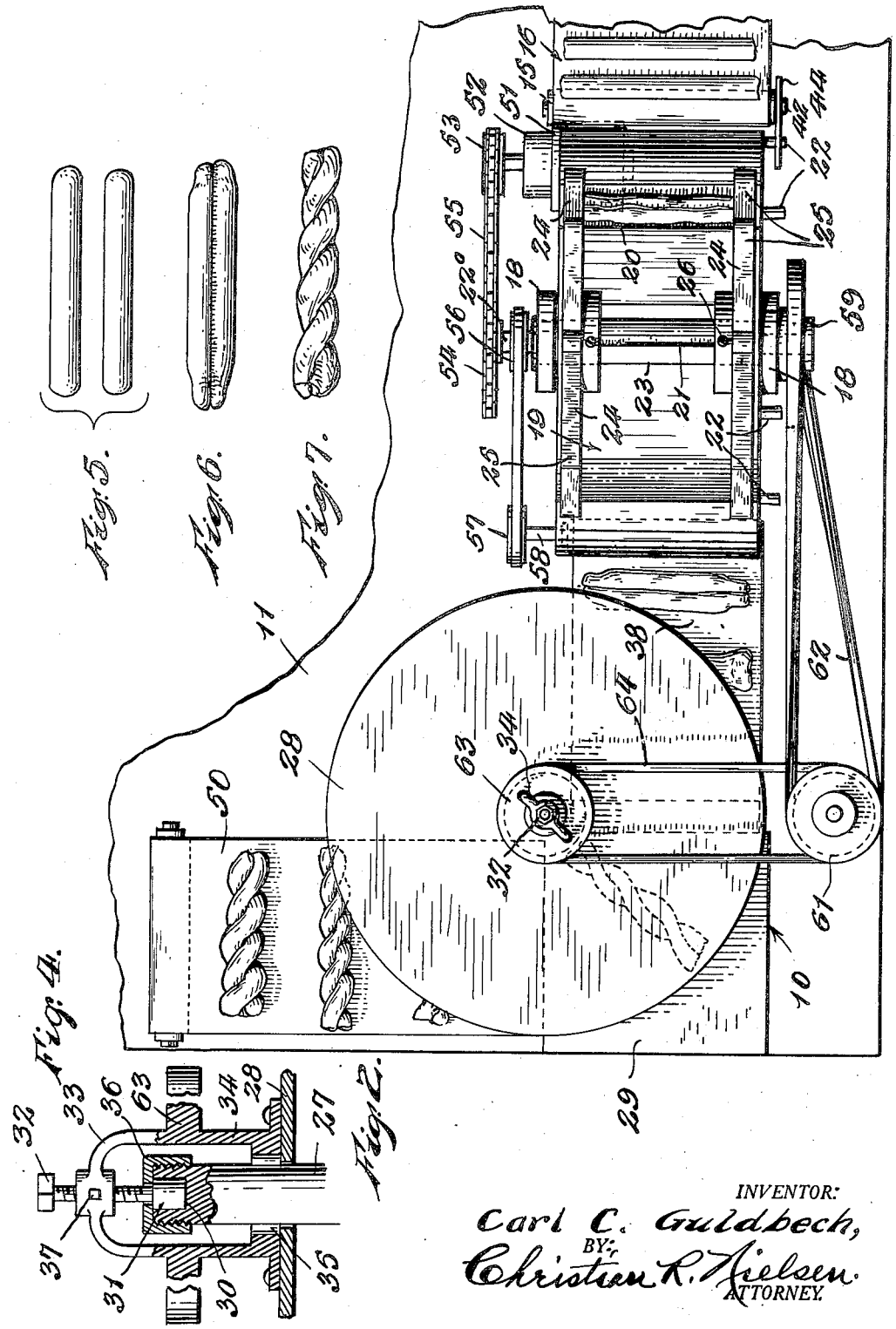
INVENTOR:
Carl C. Guldbech,
BY Christian R. Nielsen.
ATTORNEY.

Patented Oct. 4, 1938

REISSUED
APR 16 1940

2,132,158

UNITED STATES PATENT OFFICE 2,132,158

DOUGH TWISTING MACHINE

Carl C. Guldbech, Bronx, N. Y.

Application June 1, 1938, Serial No. 211,228

11 Claims. (Cl. 107—8)

This invention relates to dough twisting machines, and it consists in the constructions, arrangements and combinations herein described and claimed.

It is an object of the invention to provide a novel and simple construction of apparatus for twisting pairs of molded rolls of dough, preliminary to baking, and to this end the invention consists in means for automatically feeding paired rolls to a pick-up drum and pinching opposite ends of the rolls for the purpose of securing the rolls together for twisting action between a rotating disk and a stationary platform, the mechanism being driven from a single power unit.

It is also an object of the invention to provide a mechanism which is portable, making it possible to transfer the apparatus to different molding machines, as desired.

It is also a further object of the invention to provide mechanism which is adjustable to various lengths of dough as well as to provide a device which may be readily regulated to operate at a speed in proportion to the speed of the molding machine.

It is a still further object of the invention to provide a novel construction of pick-up drum and drive means between the delivery conveyor and the drum.

Additional objects, advantages and features of invention will be apparent from the following description considered in connection with the accompanying drawings, wherein Figure 1 is a side elevation of the machine, partly in section.

Figure 2 is a top plan view thereof.

Figure 3 is a fragmentary enlarged detail of the feed mechanism between the delivery conveyor and the pick up drum.

Figure 4 is a sectional view through the journal of the twister disk, illustrating its mounting and adjustment.

Figure 5 illustrates a pair of rolls of dough as received from the forming machine.

Figure 6 illustrates the dough as received from the pick-up drum prior to twisting.

Figure 7 is a view illustrating the twisted loaf, ready for baking.

Attention is now invited to Figures 1, 2 and 3 of the drawings wherein there is shown a dough twisting machine generally indicated by the reference character 10, and as may be seen in Figure 1 comprises a platform 11 mounted upon casters 12 for ready movement of the apparatus to a desired forming machine, not shown.

At one end of the platform 11 there are mounted paired uprights 13 suitably spaced to support at their upper ends, rollers 14 and 15 around which there is trained an endless belt 16 for receiving formed rolls of dough from the forming machine, a chute 17 of which is shown.

In advance of the foremost upright 13 a pair of uprights 18 are mounted, one on either side of the platform, and between these uprights there is revolubly mounted a pick-up drum 19.

The drum 19 is formed as a cylinder in which a plurality of peripherally open pockets 20 are formed, the leading edge 21 of which is slightly arcuate in the direction of rotation permitting ready discharge of pinched rolls of dough from the pockets of the drum.

Upon one end of the drum laterally extended pins 22 are provided, adapted to actuate the conveyor 16 intermittently, as will appear as the description proceeds.

The uprights 18 are of a height extending a substantial distance above the upper periphery of the drum 19 and revolubly mount a shaft 23. Upon the shaft 23 there are secured a pair of pin wheels 24 each of which comprises a hub and a like number of radial spokes 25 as there are pockets 20 of the drum. The spokes 25 are suitably rounded at their ends and of a length stopping short of the bottoms of the pockets 20.

The shaft 23 is longitudinally slotted and the hub of each pin wheel 24 has a set screw 26 complemental to the slot whereby the pin wheels may be rigidly secured to the shaft.

Since the machine is adjustable to accommodate various lengths of dough lateral adjustment of the pins is necessary, and this is accomplished by loosening of the set screws 26 permitting sliding movement of the wheels 24 to a position on the shaft 23 so that the ends of the arms 25 will contact and compress respective ends of the dough in the operative pocket. The pin wheels 24 will be rotated by the drum 19 through contact with the dough in the operative pocket.

In advance of the drum 19 there is an upright bearing post 27, the upper end of which revolubly mounts a dough-twisting disk 28 cooperable with a stationary platform 29 suitably supported therebeneath. Obviously, the disk 28 must be adjustable with respect to the platform 29 in order to regulate the amount of twist imparted to the dough, as well as to accommodate varying diameters of formed dough, and an example of such adjusting means is shown in Figure 4, attention being directed to this figure.

The post 27 is exteriorly threaded and axially of the post there is formed a well 30 housing a ball thrust bearing 31. The bearing 31 has fixed thereto a revoluble upright adjusting bolt 32, threadedly engaged in a yoke 33 rigidly engaged with the hub 34 of the disk 28. The hub 34 may include roller or ball bearings 35 providing free rotative action about the post 27. A cap nut 36 engaged upon the upper end of the post 27 insures retention of the bearing assembly 31 and bolt 32. Adjustment of the disk 28 upwardly or downwardly upon the post 27 is accomplished by loosening the set screw 37 and rotating the adjusting bolt 32 in a direction to raise or lower the disk 28 as desired, thereby varying the spacing between the disk 28 and the platform 29. After adjustment is obtained, the set screw 37 is again rotated to impinge upon the adjusting bolt 32.

An endless conveyor 38 is suitably mounted upon the platform 11, positioned between the drum 19 and the platform 29 and functions to receive dough from the pockets 20 and convey the dough to the platform 29 for twisting action as will be described, hereinafter.

The formed dough deposited upon the conveyor 16 must be fed to the pockets 20 of the drum in pairs and in timed relation in order that each pocket will receive a pair of formed rolls of dough, and in the present instance, I have shown a spur gear 39 fixed to the shaft 40 of the conveyor 16. In mesh with the gear 39 there is a gear 41 fixed to a stud shaft 42 carried in a suitable bearing block 43 on the forward standard 13. It will be apparent that upon rotation of the gears 39, and 41, the conveyor 16 will be moved in a direction to advance the dough towards the pockets of the drum. An actuator lever 44 is free on the shaft 42, extended in the direction of the drum 19 and of a length to be contacted by the pins 22, progressively, upon rotation of the drum. The lever 44 normally occupies a position substantially as shown in dotted lines in Figure 3, although the position of the lever 44 may be varied upon adjustment of the stop screw 45 carried in a bracket 43 on the foremost standard 13. Obviously, adjustment of the screw 45 will regulate the stroke or movement of the lever 44 which in turn regulates the degree of rotation of the gears 39 and 41, and consequently the degree of movement of the conveyor 16. Thus, the conveyor 16 may be moved in timed relation to the rotation of the drum.

The actuating means between the lever 44 and the gear 41 is in the form of a ratchet composed of a pawl 46 pivoted as at 47 to the lever 44, the free pawl adapted to engage teeth 48 of the gear 41. A light leaf spring 49 functions to hold the pawl 46 engaged with the teeth, yet permits the pawl to become sufficiently disengaged from the teeth to allow the lever 44 to return to its normal position when released from a pin 22.

A conveyor 50 is also carried by the platform 11 adapted to receive the twisted rolls, driven through any suitable means.

The drive for the drum 19, disk 28 and conveyor 38 will now be described. A suitable motor 51 is secured upon the platform 11 and preferably includes a reduction gearing, generally indicated at 52, for driving a sprocket wheel 53. The shaft 22—a has fixed thereto a sprocket wheel 54 and trained around these gears there is a sprocket chain 55 effecting a positive drive for the drum 19. The shaft 22—a has also fixed thereon a pulley 56 aligned with a pulley 57 secured to the shaft 58 of the conveyor 38, and a belt trained about these pulleys provides movement of the conveyor.

Upon the opposite side of the drum 19, the shaft 22—a has fixed thereon a pulley 59. A standard 60 (a portion of which is shown in Figure 1) supports a double pulley 61, the upper one of which receives a belt 62 from the pulley 59. The lower pulley of the double pulley 61 is aligned with a pulley 63 fixed to the yoke 34 of the disk 28, and a belt 64 trained about these pulleys provides rotation of the disk.

The ratio of the pulleys and gears employed will be such as to drive the various devices at a speed commensurate with the output of the forming machine.

The operation

The operation will be understood from the following description.

The formed rolls of dough will be deposited upon the conveyor 16 from the chute 17 and with rotation of the drum 19, a pin 22 will encounter the lever 44 moving the lever upwardly and since the ratchet 46 is in engagement with the teeth 48 of the gear 41 rotation will be imparted thereto with consequent rotation of the gear 39 and forward movement of the conveyor to advance two of the rolls into the adjacent pocket 20 of the drum. The pockets 20 are only of such depth as to accommodate two rolls of dough, the third or following roll of dough being held back slightly outward of the periphery of the drum. However, if the third roll should move forwardly by gravity, as indicated in dotted lines, the periphery of the drum will move the roll backwardly without deforming the dough. The drum continues to rotate, advancing the pockets toward the pin wheels 24 until one of the spokes 25 of each wheel engages respective ends of the dough, causing a compression or pinching of the rolls so that they will adhere. Further rotation of the drum will deposit the pinched rolls upon the conveyor 38. Of course, after contact and release between a pin 22 and lever 44, the lever will fall back to its normal position, by gravity, in readiness for contacting engagement with a following pin 22, making a continuous feed of paired rolls of dough into the respective pockets.

The conveyor 38 being driven advances the dough up to the receiving edge of the platform 29 at which point the rotating disk 28 frictionally contacts the dough. The dough will be deposited upon the platform with one end disposed toward the axis of the disk, the other end being presented in the direction of the periphery thereof, and consequently the end adjacent the periphery will be caused to rotate at a higher rate of speed than the end adjacent the periphery, this difference in rotation causing a twisting together of the two rolls of dough which is finally discharged upon the conveyor 50. The twisted rolls are then taken from the latter conveyor and placed in pans for baking.

While I have shown and described a specific construction of machine for twisting dough, this is by way of illustration only and I consider as my own all such modifications in structure as fairly fall within the scope of the appended claims.

I claim:—

1. In a dough twisting machine, a revoluble drum having peripheral pockets for receiving formed dough, timed means for feeding dough to respective pockets, a rotating disk, a platform fixed therebeneath, and means between the drum and the disk for advancing the dough to a position extending radially of the axis of the disk, the disk being in frictional contact with the dough.

2. In a dough twisting machine, a revoluble drum having peripheral pockets for receiving formed dough, means for feeding dough to respective pockets, means between the drum and feeding means for actuating the feeding means in synchrony with presentation of pockets in advance of the discharge point of the feeding means, a rotating disk, a platform therebeneath, means for advancing the dough discharged from the pockets to a position on the platform extending radially of the disk, the disk being in frictional contact with the dough.

3. In a dough twisting machine, a revoluble drum having peripheral pockets for receiving formed dough, conveyor means for feeding a pair of rolls of dough to respective pockets, means between the drum and the conveyor for actuating the conveyor in synchrony with presentation of pockets in advance of the discharge point of the conveyor, a revolving pin wheel adjacent the ends of the drum, each wheel having radially extended arms of a length to enter the pockets under rotation for compressive action upon respective ends of the dough within the engaged pocket, conveyor means for receiving dough rolls discharged from the drum, a platform for receiving dough rolls from the conveyor, a rotating disk above the platform spaced to permit reception of the dough rolls therebetween, the disk being in frictional contact with the rolls of dough, and conveyor means for receiving the twisted rolls of dough from the platform.

4. The structure of claim 3 in which the disk is vertically adjustable with respect to the platform.

5. In a dough twisting machine, a revoluble horizontally disposed drum having peripheral pockets extending throughout its length, means for driving the drum, including speed reduction gearing, conveyor means for feeding a pair of rolls of dough to respective pockets, the conveyor including a driven gear, a gear in mesh therewith, ratchet means associated with the last named gear and including a lever, a pin on the drum rearwardly of each pocket, said pins being of a length to engage and move the lever of the ratchet to effect movement of the conveyor, a revoluble pin wheel adjacent the ends of the drum, each wheel having radially extended arms of a length to enter the pockets under rotation for compressive action upon respective ends of the dough rolls within the engaged pocket, conveyor means for receiving dough rolls from the drum, drive means between the drum and the conveyor, a stationary platform at the discharge end of the conveyor, a rotating disk above and to one side of the platform, drive means between the drum and disk, said disk having frictional contact with the rolls of dough and conveyor means for receiving the dough from the platform.

6. The structure of claim 5 in which the disk is vertically adjustable with respect to the platform.

7. The structure of claim 5 in which an adjustable stop means limits return movement of the ratchet lever.

8. The structure of claim 3 in which the pin wheels are laterally adjustable to accommodate varying lengths of dough.

9. In a dough twisting machine, a wheeled platform, a pair of uprights thereon, a drum revolubly supported by the uprights, said drum having a plurality of peripheral pockets extending through its length, means for driving the drum, including speed reduction gearing, conveyor means for feeding a pair of rolls of dough to respective pockets, the conveyor including a driven gear, a gear in mesh therewith, the last named gear having ratchet teeth, a pawl member complemental to the ratchet teeth and including a lever, a pin on the drum rearwardly of each pocket, said pins being of a length to engage and move the lever of the pawl to effect movement of the conveyor, a revoluble pin wheel adjacent the ends of the drum, each wheel being laterally adjustable with respect to the drum, each wheel having a plurality of radially extended arms of a length to enter the pockets under rotation for compressive action upon respective ends of the dough rolls within the engaged pocket, conveyor means for receiving dough-rolls from the drum, drive means between the drum and the conveyor, a stationary plate upon the platform at the discharge end of the conveyor, a rotating disk above and to one side of the plate, drive means between the drum and disk, said disk having means regulating the spacing between itself and the plate, and conveyor means for receiving the twisted dough from the stationary plate.

10. The structure of claim 3 in which the pockets are of a depth to accommodate but two rolls of dough.

11. In a dough twisting machine, a revoluble drum having peripheral pockets for receiving formed dough, timed means for feeding a pair of rolls of dough to respective pockets, means for compressing respective ends of the dough together, a rotating disk, a platform fixed therebeneath, and means between the drum and the disk for advancing the dough to a position extending radially of the disk, the disk being in frictional contact with the dough.

CARL C. GULDBECH.